June 21, 1932.  G. E. BRENNER  1,863,964
RUBBISH CART
Filed Aug. 23, 1927   2 Sheets-Sheet 1
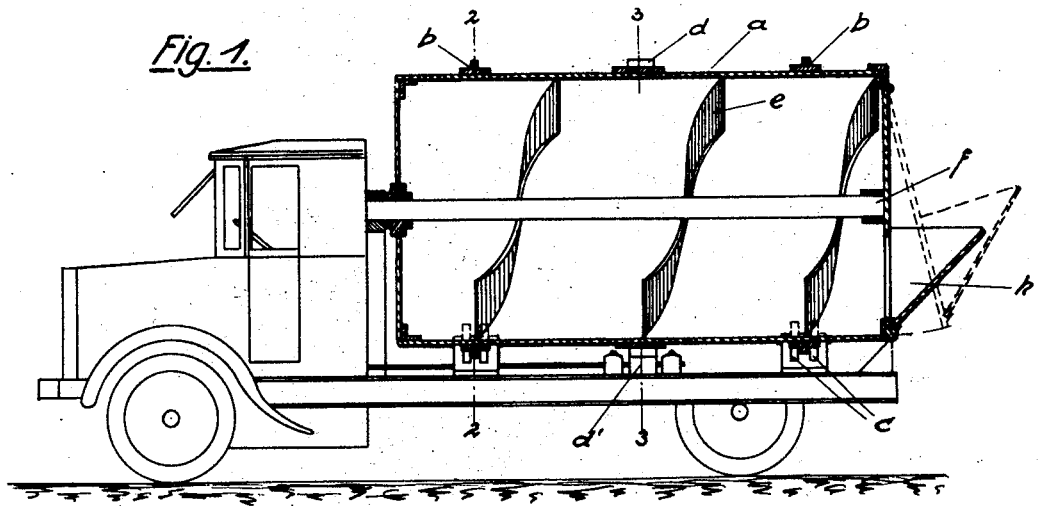
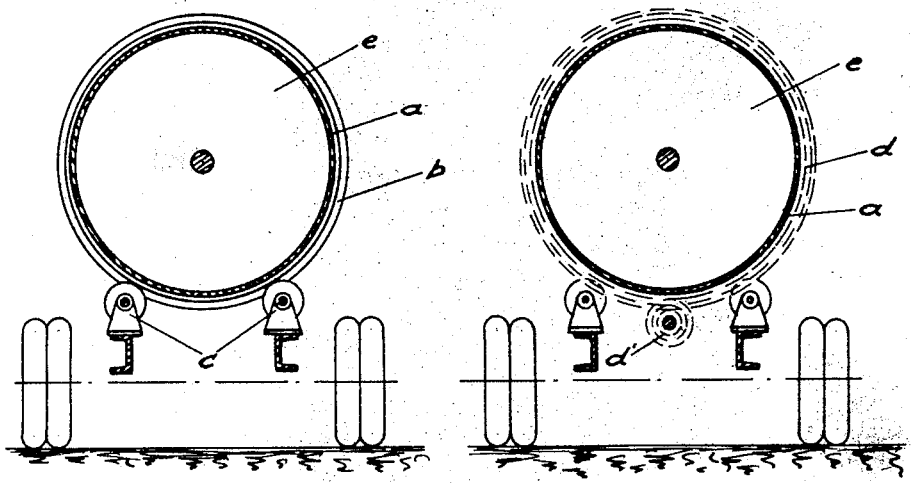
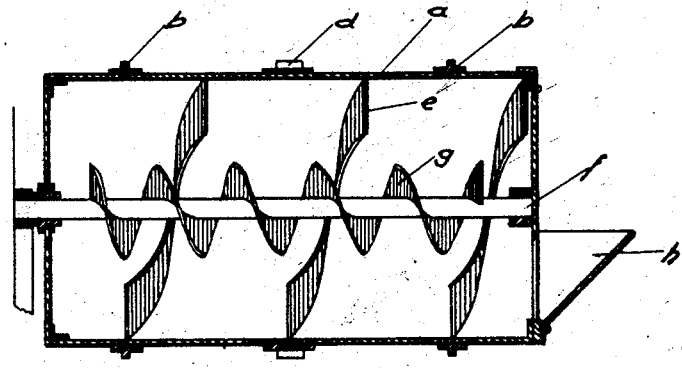
Inventor:
G. E. Brenner
By Marks & Clerk
Att's June 21, 1932.　　　　G. E. BRENNER　　　　1,863,964
RUBBISH CART
Filed Aug. 23, 1927　　　2 Sheets-Sheet 2
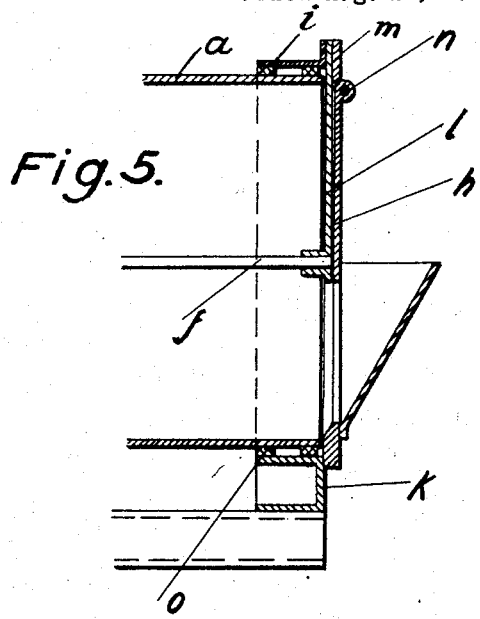
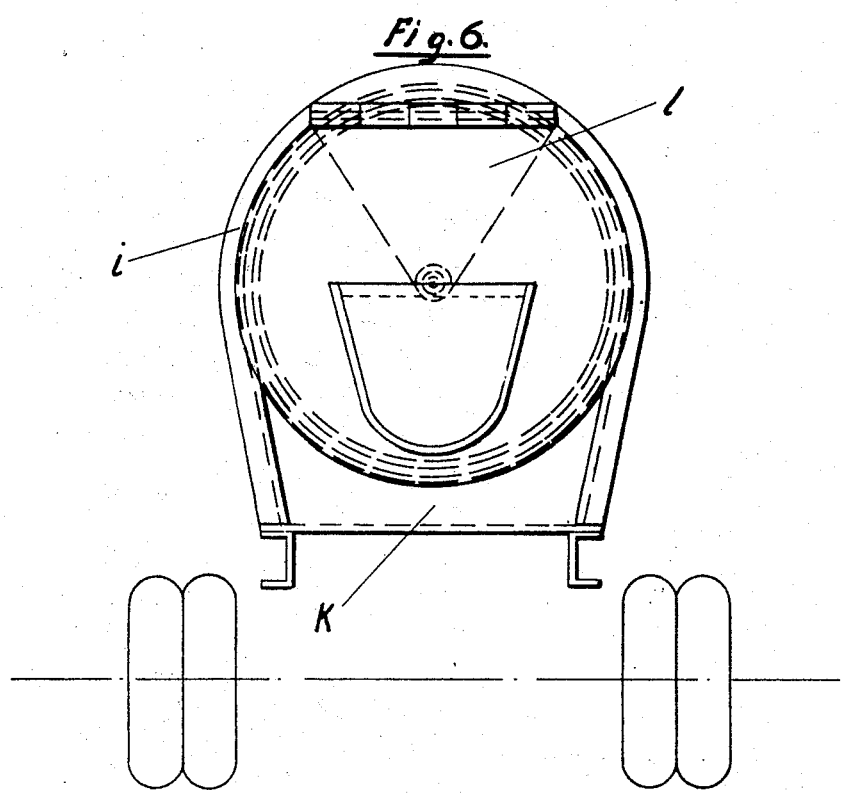
Inventor
G. E. Brenner
By Marks & Clerk
Attys.

Patented June 21, 1932

1,863,964

UNITED STATES PATENT OFFICE

GUILLERMO EMILIO BRENNER, OF DUSSELDORF-OBERKASSEL, GERMANY, ASSIGNOR TO DAIMLER-BENZ AKTIENGESELLSCHAFT, OF STUTTGART-UNTERTURKHEIM, GERMANY, A CORPORATION OF GERMANY

RUBBISH CART

Application filed August 23, 1927, Serial No. 214,845, and in Germany September 4, 1926.

This invention relates in general to rubbish carts or wagons and more particularly to rubbish carts built in the form of motor driven vehicles comprising a rubbish container with a rubbish propeller arranged in its interior.

An important feature of the invention consists in a rotatable rubbish holder or container and a rubber moving member or propeller (worm or vanes) arranged within the container to rotate therewith so that the rotation of the same in one direction causes the rubbish to move into the container while the rotation in the opposite direction causes the rubbish to be removed therefrom.

A modified arrangement may comprise, in addition to the rubbish propelling worm or vanes arranged in the container, a fixed or movable rubbish-propelling worm that is supported on the shaft around which the rubbish container revolves. The container is rotated by motor power, preferably by the motor that drives the cart.

An advantage of the novel arrangement over known devices is that all requirements that have to be met by an effective, reliable rubbish cart are fulfilled by simple means. For the loading of rubbish a door or opening arranged at a convenient height is arranged at the rear end of the cart; the rubbish propelling worms seize the rubbish inserted through said opening and move it on without pressing it in any way. When the rubbish container is filled up to a certain height no more rubbish is taken in.

To discharge the rubbish the rear wall of the cart is swung open and the container is rotated in the reverse direction, the rubbish being thus discharged automatically in a very short time. A noteworthy feature that eliminates a number of possible sources of trouble is that the cart is discharged without any tilting, although the rubbish container may be arranged to be tilted backwards for discharging without departing from the scope of the invention. The amount of power required is very small, because both the loading and discharging of the rubbish is effected without its being pressed. Consequently there is no appreciable wear and tear.

Two constructional forms of the invention are illustrated in the accompanying drawings in which Fig. 1 is a longitudinal section of a rubbish wagon, Fig. 2 is a cross-section on the line 2—2, Fig. 3 a cross section on the line 3—3, and Fig. 4 a longitudinal section of a modified rubbish cart according to the invention.

Figs. 5 and 6 are respectively a sectional and front elevational view of the rear part of the rubbish cart.

The rubbish holder or container $a$ of the rubbish cart is arranged to be rotated on supports near the front and rear of the frame of the vehicle. The container has two running rings $b$ of T-shaped cross-section which support the container on pairs of rolls $c$. Fixed on the periphery of the container midway between its ends is a ring of teeth $d$ that mesh with a pinion $d'$. This pinion $d'$ may be fixed on one of the motor shafts or coupled in any other manner with the motor so that the rubbish container is rotated round its horizontal axis when the cart is moving or at a standstill. Fixed to the inside of the rubbish container shown in Fig. 1 is a worm or screw-shaped rubbish propeller $e$ or a set of screw-shaped propeller vanes or vanes arranged in the form of a screw. In the modification shown in Fig. 4 a worm $g$ on the horizontal shaft $f$ or set of vanes in the form of a worm, is arranged inside the outer worm $e$. In both constructional forms the rear, open end of the rubbish container is provided with a fixed wall in which there is a door $h$ that can be swung open to receive and discharge the rubbish. In Figures 5 and 6 the rear part of the container is illustrated on a larger scale and in a somewhat changed form. The stationary wall is formed by a horse-shoe shaped profile iron $i$ and a lower closing plate $k$. Shaft $f$ is supported in a fixed bearing, which by means of the plate $l$ is connected with the profile iron $i$. To the top part of the horse-shoe shaped profile-iron $i$ is fixed a plate $m$ which carries the pivots $n$ on which the door $h$ can swing. Any device not shown may be used for keeping the door in the closed position and between the rotatable container a and the stationary wall, packing o can be provided. The rubbish cart is operated as follows: To load the cart while it is standing still or moving the driving mechanism for rotating the rubbish container is started. The rubbish thrown in through the door h is then seized by the rubbish propellers and moved inward due to the rubbish container or drum. When the container has been filled to a certain height no further rubbish is moved in. By this means the pressing of the rubbish into a mass rotating unitarily with the container and the trouble caused thereby is automatically prevented.

The container may be kept moving slowly without interruption or it may be set going at certain intervals only according to the requirements of the case. The power consumed is very small because no resistance occasioned by pressing of the material has to be overcome. The specific density of the rubbish lodged in the container is great because, by being continually moved, it is shaken together so that the weight per unit of space of the shifted rubbish is greater than that of rubbish not thus shifted. To empty the container its direction of rotation is reversed and the door in the rear wall is swung open. By this means the rubbish is automatically discharged in a very short time from the container. In the modification shown in Fig. 4 the worm g also operates to shift the rubbish and agitate the same to further provide against packing of the rubbish.

It is to be understood that by the term "rubbish" I mean all sorts of waste material usually comprehended in the term "city refuse" and such term includes not only wet and dry street sweepings, but also garbage and night soil.

I claim:—

1. A rubbish cart comprising a rotatable rubbish container, a worm arranged on the inner circumference of the wall of said container and fastened thereto, said worm rotating together with said container, said worm being formed by a screw plane which is less broad than the radius of the container, a shaft arranged longitudinally within the container a second worm arranged in the free space around said shaft and inside the inner circumference of said first mentioned worm, closing means for closing the open end of said rotatable container, said closing means being fastened to a part of the cart frame which does not participate in the rotation of the container, and an opening arranged in said closing means for loading the rubbish into the container.

2. A vehicle for collecting and conveying rubbish comprising a rotatable cylindrical container, guiding rings on the outer circumference of the wall of said container, a frame and wheels on which the container is arranged, rollers coöperating with the guiding rings on the container wall arranged on said frame serving for carrying said container, said rollers rolling along said guiding rings, a number of teeth arranged on the outside of said container wall a rotatable shaft arranged on the frame, a pinion on said shaft cooperating with said teeth on said container wall for rotating said cylindrical container, a rubbish propelling worm arranged on the inner circumference of the wall of said container and fastened thereto, said worm rotating together with said container, a fixed wall for closing the open end of the cylindrical container, arranged at the back part of said container, an opening for loading the rubbish into the container arranged in said fixed wall, a hopper for feeding the rubbish into the container arranged before said opening in said fixed wall.

3. A vehicle for collecting and conveying rubbish comprising a rotatable cylindrical container guiding rings on the outer circumference of the wall of said container, a frame and wheels, on which the container is arranged, rollers cooperating with the guiding rings on the container wall arranged on said frame, serving for carrying said container, said rollers rolling on said guiding rings, a number of teeth arranged on the outside of said container wall, a rotatable shaft arranged on the frame underneath the container, a pinion on said shaft cooperating with said teeth on said container wall for rotating said cylindrical container, a rubbish propelling worm arranged on the inner circumference of the wall of said container and fastened thereto, said worm rotating together with said container, said worm being formed by a screw plane, which is less broad than the radius of the container, a second worm, arranged in the free space around the containershaft and inside the inner circumference of said first mentioned worm, said second worm being rotatable with regard to the first mentioned worm, a fixed wall for closing the open end of the cylindrical container arranged at the back part of said container, an opening for loading the rubbish into the container, arranged in said fixed wall, a hopper for feeding the rubbish into the container arranged before said opening in said fixed wall.

4. A rubbish cart comprising a rotatable rubbish container, a worm arranged on the inner circumference of the wall of said container and fastened thereto, said worm rotating together with said container and serving for conveying the contents of said container in the forward direction, a wall for closing the open end of the container, said wall being fastened to a part of the cart frame which does not participate in the rotation of the container, an opening for loading the rubbish into the container, arranged in said wall at the back of said container, said wall being formed as a cover which can be opened in order to empty the said container.

5. A rubbish cart comprising a rotatable rubbish container, a worm arranged on the inner circumference of the wall of said container and fastened thereto, said worm rotating together with said container and serving for conveying the contents of said container in forward direction, a wall for closing the open end of the container, said wall being fastened to a part of the cart frame which does not participate in the rotation of the container, an opening for loading the rubbish into the container arranged in said wall at the back of said container, said wall being formed as a cover which can be opened in order to empty said container, the top of said cover being hinged to a fixed part of the vehicle, said cover being pivotally attached in such a way that it can pivot to the outside of the container in order that the container may be perfectly emptied.

6. A rubbish cart, comprising a rotatable rubbish container, said rubbish container being open at the rear part thereof, a worm arranged on the inner circumference of said container and fixed thereto, a non-rotatable frame fixed to said cart, said frame closing the open rear part of said container, and a door pivotally arranged on said frame for giving admittance to the inside of said container from outside.

7. A rubbish cart, comprising a rotatable rubbish-container, said rubbish container being open at the rear part thereof, a worm arranged on the inner circumference of said container and fixed thereto, a non-rotatable frame fixed to said cart, said frame closing the open rear part of said container, and a door in said frame covering completely the opening in the rear part of the container, said door having an opening therein for filling the rubbish into the container.

In testimony whereof I affix my signature.

GUILLERMO EMILIO BRENNER.